US005419035A

United States Patent [19]

Twigg

[11] Patent Number: 5,419,035

[45] Date of Patent: May 30, 1995

[54] SNAP ATTACHING TOOL

[76] Inventor: Jeannine A. Twigg, 31458 Kenwood, Madison Heights, Mich. 48071

[21] Appl. No.: 181,902

[22] Filed: Jan. 14, 1994

[51] Int. Cl.[6] .......................... B23P 19/08; B25B 27/02

[52] U.S. Cl. .................................. 29/798; 29/243.519; 29/271; 29/453; 227/15

[58] Field of Search ...................... 29/4, 238, 270, 271, 29/275, 243.518, 243.519, 243.521, 243.54, 267, 281.1, 283.5, 432, 432.1, 453, 798, 811.2, 812.5; 227/12, 15, 18, 31

[56] References Cited

U.S. PATENT DOCUMENTS

| | | | |
|---|---|---|---|
| 2,310,007 | 2/1943 | Wolff | 29/432.1 |
| 2,413,702 | 1/1947 | Penton | 29/275 |
| 2,920,325 | 1/1960 | Janes et al. | 227/15 X |
| 4,090,652 | 5/1978 | Silverbush | 29/798 X |
| 4,108,346 | 8/1978 | Minix | 29/281.1 X |
| 4,309,806 | 1/1982 | Cilione | 29/243.519 X |

FOREIGN PATENT DOCUMENTS

| | | | |
|---|---|---|---|
| 997555 | 7/1965 | United Kingdom | 227/15 |

*Primary Examiner*—Peter Dungba Vo
*Attorney, Agent, or Firm*—C. J. Fildes & Co.

[57] ABSTRACT

A snap attaching tool for attaching stud and socket type snap assemblies to an edge or intermediate location of a fabric or other carrier material. Separable base, stabilizer and top elements respectively carrying a seat recess with a convex floor, a guide opening and an assembling punch are normally aligned by a base mounted rectangular spindle. The spindle permits relative vertical adjustment of the elements and is removable to allow for attaching snaps at locations distant from the edge of the material. The oblong shape of the elements with arcuate aligned sides promotes easy holding of the tool end distant from the location for striking with a hammer during use.

13 Claims, 2 Drawing Sheets

FIG - 1
PRIOR ART
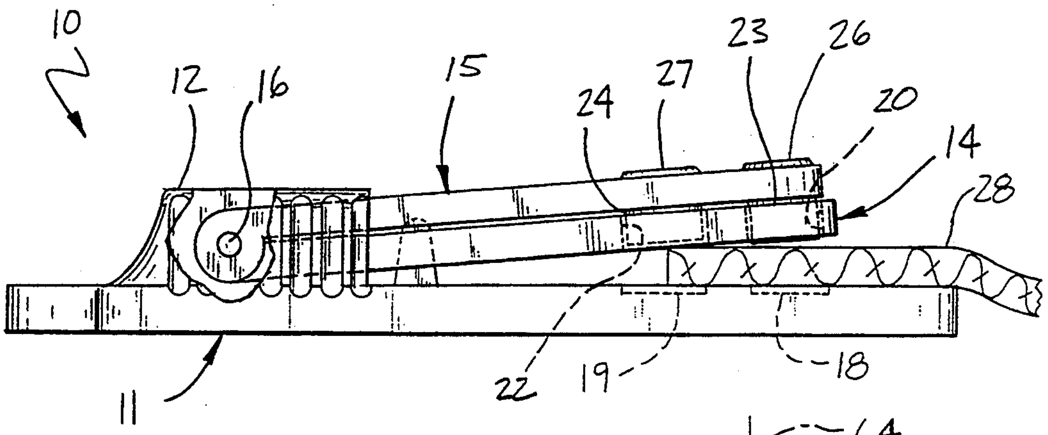
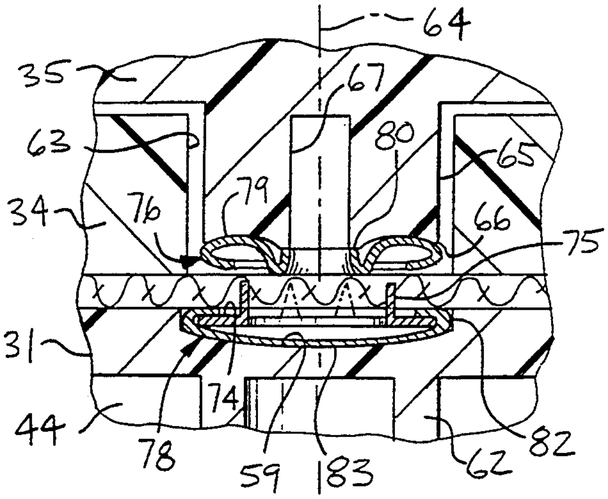
FIG - 5
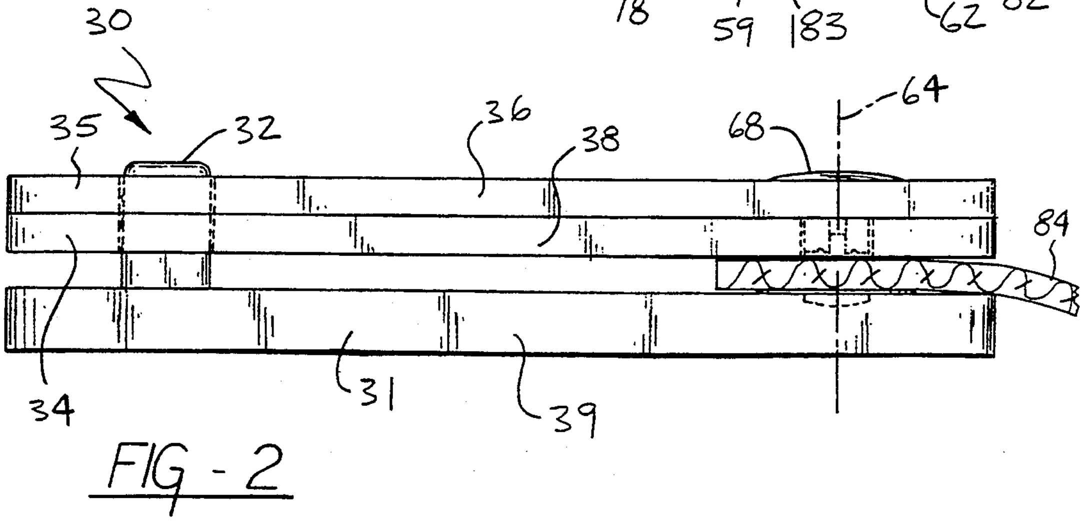
FIG - 2

FIG - 3
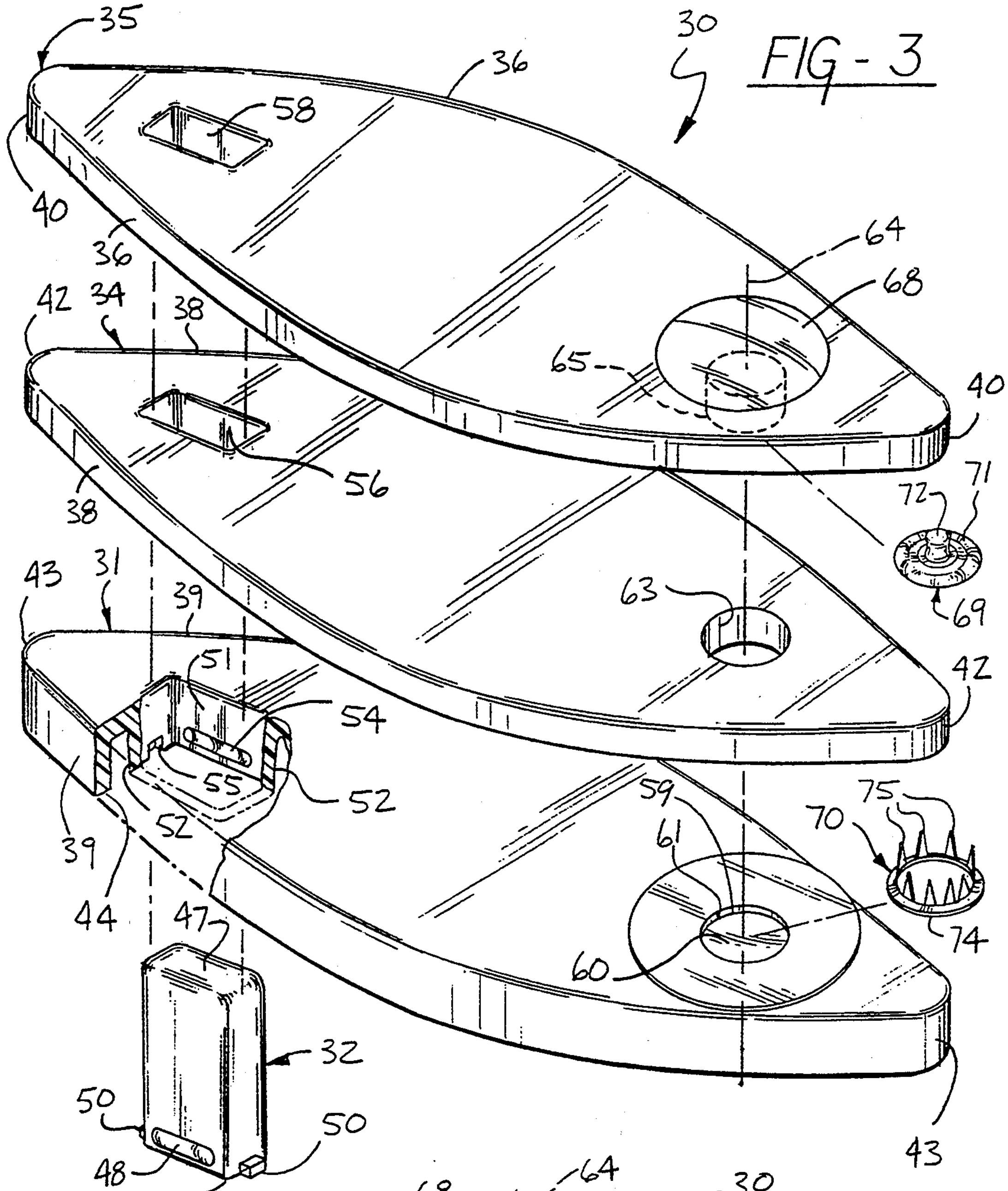
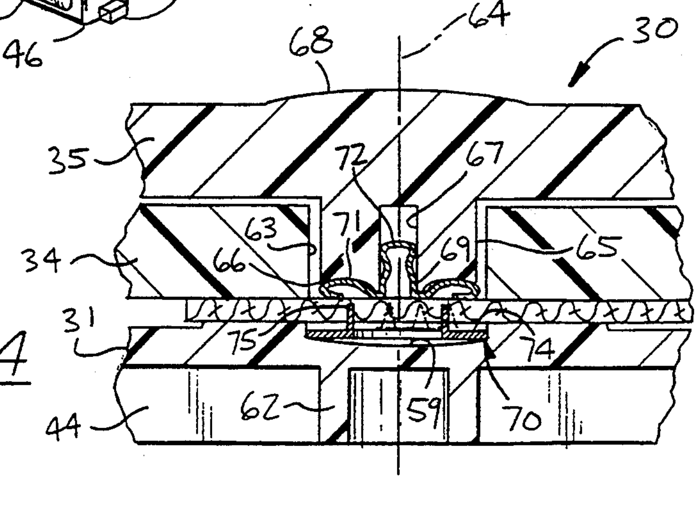
FIG - 4

SNAP ATTACHING TOOL

TECHNICAL FIELD

This invention relates to tools for attaching snap fasteners to carrier materials such as fabric, leather and vinyl used in garments and other products.

BACKGROUND ART

It is known in the art relating to carrier material fasteners to provide snap fasteners having separate stud and socket assemblies attached to edges or other portions of a garment, sheet or other product to removably secure such portions together by "snapping" the stud assembly into the socket assembly. Various types of snap fasteners in use include a pronged type and a center post type as well as others. In general, the stud and socket assemblies of these snap fastener sets each include two parts: (1) a connecting member having connecting means, either a stud or socket and (2) a retaining member. The connecting and retaining members are secured on opposite sides of the carrier material by retaining means such as (a) prongs and a prong-receiving annular recess or (b) a post and a post-receiving recess or flange. The prongs or post extend through the carrier material into the recess or flange and are interlocked therewith by forcing the connecting and retaining members together against the carrier material, thus deforming the prongs or post into or against the receiving recess or flange and fixedly attaching the connecting (stud or socket) member to the desired portion of the carrier material.

Prior tools which have been used for attaching snap fasteners to garments and other materials have ranged from complicated machine setups to simple manual means, such as a wooden thread spool held against the connecting member and struck several times with a hammer while the retaining member is seated against a solid surface and the retaining means are engaged. Such manual means may involve difficulty in maintaining alignment of the assembly members while applying the hammer blows which force the members together.

A prior art tool 10 intended for attaching Gripper brand snap assemblies to an edge of a carrier fabric is shown in FIG. 1. The tool 10 includes a base 11 having upstanding sides 12 that pivotally support a stabilizer arm 14 and a punch arm 15. The sides are ribbed, apparently to aid gripping with fingers in use. Near the end opposite the pivot axis 16, the base 11 carries a pair of longitudinally spaced flat bottomed recesses 18, 19 adapted to receive the retaining members of two different sizes of fasteners. The arm 14 includes guide openings 20, 22, respectively, aligned with the recesses 18, 19. The openings 20, 22 apparently locate the connector members of the snap assemblies prior to assembly. The arm 15 carries a pair of downwardly protruding punches 23, 24 sized to enter the guide openings 20, 22 and engage a connector member therein. Assembly would then be completed, presumably by striking the upper side of the arm 15 with a hammer opposite the location of the member engaging die. Raised areas 26, 27 on the top of the arm 15 opposite the punches indicate the locations for striking with the hammer. Only one snap assembly would be attached at one time in the appropriate sized one of the associated punch, opening and recess locations.

The prior tool 10 is adapted for use only with flat ended retainer members, cannot be used to apply snap assemblies to locations other than near the edges of a carrier material and is limited by the pivoting arms to use with a small range of thickness variations of the carrier material to which the snap assemblies are to be attached. As shown in FIG. 1, attempted use of a thicker than intended material 28 could cause excessive canting of the arms 14, 15 and the punch 23 and prevent the punch from pushing the members of the snap assembly squarely together, resulting in an unsatisfactory assembly. Also the shape and small size of the apparatus 10 makes holding with the fingers somewhat difficult and allows the possibility of striking the hand or finger with the hammer.

SUMMARY OF THE INVENTION

The present invention provides an improved tool for attaching various types of snaps to carrier materials of varying type and thickness.

The tool comprises three stackable elements; a base, middle bar or stabilizer and top aligned by a removable guide spindle during use. The stackable elements have, in plan view, identical oblong shapes with curved, preferably arcuate, sides meeting at rounded ends to form an assembly easily grasped and held by a users hand. The guide spindle is non-round, preferably rectangular, and is detachably retained in the base near one end, extending upward through close fitting openings in the stabilizer and top to maintain alignment of the elements in use.

Preferably a circular seat recess in the base near the end opposite from the spindle is made with a concave floor able to guidingly receive either capped and ring or flat base snap members to position them for assembly. A cooperating guide opening in the stabilizer and a universal punch protruding down from the top are aligned on a common axis with the seat recess. The recess, guide opening and punch of each apparatus made according to the invention is sized and configured for use with one or more of the various sizes and types of snap assemblies capable of being assembled by manual impact deformation. Preferably the punch is configured to accept both stud and socket members of mating snap assemblies while the concave floor of the seat recess in the base functions to guide and accept both capped (convex) and flat end retaining members.

The spindle has a length sufficient to allow some vertical adjustment of the stabilizer and top relative to the base. This assures that squareness of the punch with the seat recess may be maintained with any of the differing thicknesses of material to which snap assemblies may be attached.

Use of the tool with the guide spindle in place is preferred for the most common function-of attaching snap assemblies to a carrier material near an edge. However, the apparatus may also be used for attaching snaps away from the edge by detaching the spindle from the base and manually aligning the elements during use.

These and other features and advantages of the invention will be more fully understood from the following description of certain specific embodiments of the invention taken together with the accompanying drawings.

BRIEF DESCRIPTION OF THE DRAWINGS

In the drawings:

FIG. 1 is a side elevational view of a prior art snap attaching tool shown in position for attaching a snap near an edge of a relatively thick carrier material;

FIG. 2 is a side elevational view of a snap attaching tool according to the invention and also positioned for attaching a snap near the edge of a relatively thick carrier material;

FIG. 3 is an exploded pictorial view of the tool with the connecting and retaining members of an exemplary stud snap assembly and broken away to show the retention means for the base mounted spindle;

FIG. 4 is a longitudinal cross-sectional view through the snap attaching portion of the assembled tool in position to attach a stud type snap assembly; and FIG. 5 is a view similar to FIG. 4 but showing a socket type snap assembly with a capped prong ring retainer member.

DETAILED DESCRIPTION OF THE INVENTION

Referring now to FIGS. 2–4 of the drawings in detail, numeral 30 generally indicates a specific embodiment of a snap attaching tool according to the invention. Tool 30 comprises a base 31 with a removably mounted spindle 32. A middle bar or stabilizer 34 and a top 35 are sequentially assembled on the spindle overlying the base 31. The parts are preferably molded of a high impact ABS plastic material for durability and resilience although other suitable materials such as steel and wood could be used if desired.

In a preferred embodiment, the top 35, stabilizer 34 and base 31 elements are oblong in plan view, having opposite sides 36, 38, 39, respectively, approximating arcs of circles joined at relatively sharp but curved ends 40, 42, 43. The elements have a length of about 5 inches and a maximum width of about $1\frac{5}{8}$ inches with the sides 36, 38, 39 approximating circular arcs of about 5 inches in radius. The top 35 and stabilizer 34 are generally flat and about $\frac{3}{8}$ inch thick while the base 31 is about 7/32 inch deep, hollowed on the bottom for molding with a full perimeter flange 44 and internal support where needed. The assembled tool is thus sized for easy grasping at one end by the hand of the user while the other end is free for striking with a hammer.

The spindle 32 has a rectangular shape in the plan view with a longitudinal dimension of about $\frac{1}{2}$ inch, a width of about $\frac{1}{4}$ inch and a height of about 9/16 inch. This allows sufficient extension above the assembled elements to maintain guidance with the insertion of various thicknesses of carrier material, such as fabric, leather, vinyl, etc. The spindle is hollow with an open bottom 46 and closed upper end 47. Near the open bottom edge, the longer sides have longitudinally extending shallow ribs 48. Small tabs 50 protrude from the bottom edges of the shorter sides of the spindle 32. The exposed edges of the spindle 32 and the other elements 31, 34, 35 are rounded for comfort when handling the assembled tool. It should be understood that the dimensions indicated are for a specific presently preferred embodiment but that they may be varied as needed to accomplish the purposes of the invention in particular instances.

Near one end, the base 31 has a rectangular spindle mounting opening 51 having the longer sides extending longitudinally of the oblong base 31. The opening 51 extends through a flange 52 extending downward the length of the peripheral flange 44. Near the lower end, the longer sides of the opening have longitudinal shallow recesses 54 while the shorter sides have small cutouts 55 opening to the inside and bottom of the flange 52. In assembly, the spindle 32 is inserted into the opening 51 from the bottom and the tabs 50 are received in the cutouts 55 to limit the upward travel of the spindle and position its open bottom 46 flush with that of the flange 52. The ribs 48 of the spindle then snap into the recesses 54 of the opening 51 to retain the spindle 32 in position until it is pushed out the bottom by the user. Corresponding rectangular openings 56, 58 are provided through the stabilizer 34 and top 35, respectively, for close fitting entry of the spindle 32 during assembly of the stabilizer and top with the base 31. The elements 31, 34, 35 are thereby retained in aligned overlying relationship while vertical separation of the elements is provided for.

Near the end opposite the location of the spindle opening 51, the base has on its upper surface a slightly raised area centrally of which is a shallow circular recess forming a seat 59. The floor 60 of the seat recess 59 is preferably slightly concave to approximate the end curvature of capped ring snap members of a size and type for which the particular tool is intended. A shallow rim 61 surrounding the floor 60 guidingly retains both capped and open ring or flat end snap members of associated snap sets. The concave floor assists in centering such members when they are slightly smaller than the seat recess 59. A cylindrical boss 62 (FIG. 4) extends below the seat 60 to provide support for the seat area in use.

The stabilizer 34 is provided with a circular guide opening 63 that is positioned to be aligned on a vertical axis 64 through the center of the seat recess 59 when the base and stabilizer are assembled. The opening 63 is sized to guidingly receive the stud and socket connecting elements of snap sets for attachment by the tool and maintain them in essentially centered relation with the seat recess.

Similarly, the top 35 is provided with a downwardly protruding punch 65 sized to enter the stabilizer guide opening. The punch 65 is suitably shaped to engage a snap connecting member in the guide opening to force it into assembly with its associated retaining member. In the disclosed embodiment, the punch 65 includes a depending circular edge 66 surrounding a recessed portion and a central blind hole 67. The punch 65 with its edge 66 and hole 67 are centered on the axis 64 when the top 35 is assembled with the stabilizer 34 and base 31. A shallow raised dome 68 on the top 35 located centrally above the punch 65 provides a target for striking with a hammer.

FIGS. 3 and 4 also best illustrate the members of one form of snap assembly which may be attached to carrier materials according to the invention. The assembly includes a connecting member 69 of the stud type and a retaining member 70 of the open prong ring type. The connecting member 69 includes an annular rim 71 formed with a flange sloping upward and outward and then down and finally inward to form an annular space opening through a slot around its inner bottom. A stud 72 extends upward from the center of the rim. The retaining member 70 includes a formed ring 74 having a shallow U-shaped cross section for strength and provided with a plurality of sharp prongs 75 spaced around and extending upward from the inner edge of the ring.

FIG. 5 shows in cross-section a view similar to FIG. 4 but illustrating in the attaching tool 30 a socket type connecting member 76 and a capped prong ring retainer member 78. These comprise, prior to their assembly, the members of a socket type snap assembly connectable with the stud assembly made up of the stud connecting member 69 and the open prong ring retaining member 70 of FIGS. 3 and 4.

The socket type connecting member 76 includes an annular rim 79 similar to rim 71 of the stud connecting member 69. However, in place of the internal stud, there is formed an open spring socket 80 sized to connect with and grip the stud 72 of the connecting member 69. The capped retainer member is made up of a an open prong ring 70 having a ring 74 and prongs 75. However, an end cap 82 is added enclosing the ring 74 and closing the open end with a slightly convex decorative end wall 83.

The method of using the snap attaching tool for attaching a stud type snap assembly to a carrier material will be described first with reference to FIGS. 2–4.

With the base located upon a solid flat surface, a retaining member 70 is placed in the seat recess 59 with the ring 74 seated against the convex floor 60 and within the rim 61. A fabric 84, or other carrier material to which attachment of a snap fastener is desired, is laid over the upstanding prongs 75 of the member 70 at the location near an edge of the fabric 84 where the snap assembly is to be attached. The stabilizer 34 is then fitted over the spindle 32 and brought into contact with the fabric, pushing the prongs 75 into and through the fabric.

A connecting member 69 is dropped into the guide opening 63 of the stabilizer with its stud 72 facing upward. The guide opening aligns the annular slot with the prongs for assembly. The top 35 is then installed over the spindle and pushed down until the punch 65 enters the guide opening 63. The stud 72 of the connecting member 69 is received in the blind hole 67 of the punch and the circular edge 66 engages the raised annular rim 71 of the connecting member 69.

The assembled tool 30 is then held by the users hand by grasping the sides and top near the spindle end of the tool. The raised portion 68 of the top is then struck one or more times with a hammer, compressing the fabric and causing the prongs 75 to be forced into the annular space in the rim 71. This bends the prongs within the rim until the connecting and retaining members 69, 70 are fully locked together and the snap assembly is fixed to the fabric.

Referring to FIG. 5, the assembly of an associated socket snap assembly to an associated edge of fabric, the procedure is the same as just described except that a capped prong ring retaining member 78 may be used and a socket type connecting member 76 is used. FIG. 5 shows the arrangement wherein the convex end 83 of the capped member 78 is received within the seat recess 59 and guided by the concave floor 60 and the surrounding rim 61 as before. The socket type connecting member 76 is installed in the guide opening 63 with the socket facing upward so that the circular edge 66 of the punch engages the annular rim 79. Striking the raised dome 68 with a hammer, as before, assembles the connecting and retaining members 76, 78 in the same manner as previously described for members 69, 70.

Note that when a thicker than normal material 84 is having snaps assemblies attached to it, the stabilizer 34 and top 35 may be raised parallel to the base to maintain the punch 65 square with the seat recess 59 in the base. This helps assure that the connecting and retainer members of a snap assembly will be fully locked together when attached to materials of varying thickness with the tool 30.

For use with other types of snap fasteners, such as the post type, the shape of the punch and the seat recess may be modified to properly locate and deform the members to assemble them in the manner required. Also, the seat recess, punch and other portions of the tool may be strengthened as needed by the addition of steel inserts or the like as may be needed for use with various types of snap assemblies.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A snap attaching tool for assembling snap assemblies on a carrier material, the snap assemblies each having diverse members including a connecting member and a retaining member, the connecting member including a connector, each member having inner and outer portions, the inner portions including interlocking retainers, the connecting and retaining members being capable of being assembled to the carrier material by forcing the inner portions of the diverse members together along a common axis to interlockingly engage their retainers, said tool comprising:

a base having a seat recess for guidingly receiving the outer portion of a retaining member;

a stabilizer overlying the base and having a guide opening sized to receive a connecting member;

a top overlying the stabilizer and having a downwardly protruding punch sized to enter the stabilizer guide opening, the punch having an end shaped to engage the outer portion of the connecting member;

wherein the connecting members of the snap assemblies include both stud and socket members each capable of being assembled with a retaining member, the stud members each having an outwardly projecting stud and the socket members each having an outwardly opening socket for receiving the stud of a stud member, and said punch includes an axial opening for receiving the stud of a stud member; and a guide interconnecting the base, stabilizer and top and effective to align the seat recess, guide opening and punch for relative movement along said common axis, the guide limiting substantial movement of the top and stabilizer relative to the base to a path parallel with the axis;

whereby, vertical adjustment of the spacing between the base and stabilizer is permitted, so that squareness of the punch and the seat recess is maintained and complete interlocking of the retainers of a snap assembly is assured when a compressive force adequate to fully engage the retainers is applied against the base and top along the axis.

2. The invention as in claim 1 wherein the seat recess has a concave floor for selectively receiving either convex or flat ended retainer members.

3. The invention as in claim 1 wherein the seat recess has a peripheral rim to engage and locate the outer portions of retainer members located therein.

4. The invention as in claim 1 wherein the stabilizer guide opening is sized to center a connecting member in axial alignment with a retaining member located in the seat recess prior to attaching the members together with a carrier material.

5. A snap attaching tool for assembling snap assemblies on a carrier material, the snap assemblies each having diverse members including a connecting member and a retaining member, the connecting member including a connector, each member having inner and outer portions, the inner portions including interlocking retainers, the connecting and retaining members being capable of being assembled to the carrier material by forcing the inner portions of the diverse members together along a common axis to interlockingly engage their retainers, said tool comprising:

a base having a seat recess for guidingly receiving the outer portion of a retaining member;

a stabilizer overlying the base and having a guide opening sized to receive a connecting member;

a top overlying the stabilizer and having a downwardly protruding punch sized to enter the stabilizer guide opening, the punch having an end shaped to engage the outer portion of the connecting member; and a guide interconnecting the base, stabilizer and top and effective to align the seat recess, guide opening and punch for relative movement along said common axis, the guide including a non-circular spindle spaced from and parallel with said axis and disposed in one of said base, stabilizer and top elements, the others of said elements including through openings having the non-circular shape of the spindle for receiving the spindle and providing guided axial movement of said other elements relative to said one element, the guide limiting substantial movement of the top and stabilizer relative to the base to a path parallel with the axis;

whereby, vertical adjustment of the spacing between the base and stabilizer is permitted, so that squareness of the punch and the seat recess is maintained and complete interlocking of the retainers of a snap assembly is assured when a compressive force adequate to fully engage the retainers is applied against the base and top along the axis.

6. The invention as in claim 5 wherein the spindle is retained in the base and is guidingly engagable with openings in the stabilizer and top to limit motion of the stabilizer and top relative to the base to substantially axial motion.

7. The invention as in claim 6 wherein the spindle is removable from the base to allow use of the tool without a guide in assembling snaps distal from an edge of the material.

8. The invention as in claim 7 wherein the spindle is rectangular and is receivable in a close fitting opening of the base, the invention further comprising interfitting retainers on the spindle and the associated opening for holding the spindle in place in the base.

9. A snap attaching tool for assembling snap assemblies on a carrier material, the snap assemblies each having diverse members including a connecting member and a retaining member, the connecting member including a connector, each member having inner and outer portions, the inner portions including interlocking retainers, the connecting and retaining members being capable of being assembled to the carrier material by forcing the inner portions of the diverse members together along a common axis to interlockingly engage their retainers, said tool comprising:

a base having a seat recess for guidingly receiving the outer portion of a retaining member;

a stabilizer overlying the base and having a guide opening sized to receive a connecting member;

a top overlying the stabilizer and having a downwardly protruding punch sized to enter the stabilizer guide opening, the punch having an end shaped to engage the outer portion of the connecting member;

wherein the base, stabilizer and top each have an oblong shape with spaced opposite ends and of a size adequate to permit striking with a hammer at a location near one end and easy hand retention of the other end distal from said location of hammer striking; and a guide interconnecting the base, stabilizer and top and effective to align the seat recess, guide opening and punch for relative movement along said common axis, the guide limiting substantial movement of the top and stabilizer relative to the base to a path parallel with the axis;

whereby, vertical adjustment of the spacing between the base and stabilizer is permitted, so that squareness of the punch and the seat recess is maintained and complete interlocking of the retainers of a snap assembly is assured when a compressive force adequate to fully engage the retainers is applied against the base and top along the axis.

10. The invention as in claim 9 wherein the base, stabilizer and top each have convexly curved opposite sides joined at longitudinally opposite ends.

11. The invention as in claim 10 wherein the sides comprise arcs of a circle.

12. The invention as in claim 11 wherein the base, stabilizer and top each have a maximum width of between $1\frac{1}{4}$ inches and $2\frac{1}{2}$ inches and a length of at least $4\frac{1}{2}$ inches.

13. The invention as in claim 12 wherein the maximum width is about $1\frac{5}{8}$ inches and the length is about 5 inches.

* * * * *

UNITED STATES PATENT AND TRADEMARK OFFICE

CERTIFICATE OF CORRECTION

PATENT NO. : 5,419,035

DATED : 05/30/95

INVENTOR(S) : Jeanine A. Twigg

It is certified that error appears in the above-indentified patent and that said Letters Patent is hereby corrected as shown below:

Title page, Item [76] Inventor:
Inventor's name, change "Jeannine" to --Jeanine--.

Signed and Sealed this

Seventh Day of November, 1995

Attest:

BRUCE LEHMAN

*Attesting Officer*

*Commissioner of Patents and Trademarks*